United States Patent [19]

Uno

[11] 3,839,723

[45] Oct. 1, 1974

[54] AUTOMATIC EXPOSURE CAMERA WITH OVEREXPOSURE AND UNDEREXPOSURE CONTROL

[75] Inventor: Naoyuki Uno, Kawagoe, Japan

[73] Assignee: Asahi Kogaku Kabushiki Kaisha, Tokyo-to, Japan

[22] Filed: Sept. 12, 1973

[21] Appl. No.: 396,658

[30] Foreign Application Priority Data

Sept. 22, 1972 Japan.............................. 47-110286

[52] U.S. Cl....................... 354/37, 354/28, 354/41, 354/58
[51] Int. Cl. ........................................... G03b 17/20
[58] Field of Search............ 95/31 FS, 11 V, 10 FS, 95/10 C

[56] References Cited
UNITED STATES PATENTS 3,742,824  7/1973  Ueda et al........................... 95/11 R

FOREIGN PATENTS OR APPLICATIONS 1,153,244  8/1963  Germany............................ 95/10 C

*Primary Examiner*—Robert P. Greiner
*Attorney, Agent, or Firm*—Wolder & Gross

[57] ABSTRACT

A camera including selective manual and automatic electrical exposure mechanisms is provided with a common knob for selection of manual or automatic control, adjustment of manual shutter speed and adjustment of the exposure multiplier with the automatic exposure, that is normal exposure, overexposure or underposure. An indicator tape observable through the view finder and carrying indicia corresponding to shutter speed and exposure multiplier is separably coupled to the knob to shift with the rotation of the knob. The knob is coupled to an exposure control variable resistor. In adjusting the automatic exposure for different film speed ratings, the knob is raised to uncouple it from the indicator tape and is rotated to adjust it relative to an ASA scale and to correspondingly adjust the variable resistor. By adjusting the normally depressed knob in the automatic range, the exposure multiplier is adjusted and observed in the view finder.

7 Claims, 4 Drawing Figures

3,839,723

AUTOMATIC EXPOSURE CAMERA WITH OVEREXPOSURE AND UNDEREXPOSURE CONTROL

BACKGROUND OF THE INVENTION

The present invention relates generally to improvements in automatic exposure cameras and it relates more particularly to an improved camera having a selective manually and automatically adjustable exposure mechanism in which the automatic exposure may be varied to effect overexposure and under exposure conditions.

With conventional automatic exposure control cameras such as electronic shutter cameras or EE cameras, there are obtained, independent of the intention of the photographer, pictures at exposure conditions corresponding to the average brightness of the object to be photographed, and this is generally satisfactory for ordinary and normal photographing operations. In the case of counter-light or stage photography, however, the result is usually over-or underexposure, so that an adjustment of the exposure parameters is necessary. This adjustment, both the direction and the extent thereof, has conventionally depended on the intuition of the photographer based on his past experience.

Moreover, for ordinary objects to be photographed, the photographer occasionally effects such adjustment on the ground of some desired artistic effects.

Generally, for such adjustment of the exposure parameter the photographer varies the setting for the sensitivity value of the used film (ASA), but this expedient is inconvenient because it is difficult to know such adjustment value. Such adjustment of the exposure parameter from its normal photography value will be hereinafter referred to as "exposure multiplication".

It is accordingly clear that the conventional automatic exposure camera possesses numerous drawbacks and disadvantages, particularly when applied to abnormal lighting conditions and to the production of abnormal effects.

SUMMARY OF THE INVENTION

It is a principal object of the present invention to provide an improved automatic exposure camera.

Another object of the present invention is to provide an improved camera of the type having selective manually and automatically controlled exposure mechanisms.

Still another object of the present invention is to provide an improved automatic exposure camera in which over and underexposure may be selectively effected by adjustable predetermined amounts.

A further object of the present invention is to provide a mechanism of the above nature characterized by its simplicity and reliability, ease and convenience of use, and its high versatility and adaptability.

The above and other objects of the present invention will become apparent from a reading of the following description taken in conjunction with the accompanying drawing which illustrates a preferred embodiment thereof.

In a sense, the present invention contemplates the provision of, in a camera including manually and automatically exposure control means provided with an electrical component adjustable in response to nonlight exposure parameters and a view finder, indicator means viewable through the view finder, manually controlled first means for selectively alternatively actuating the manual and automatic control means and adjusting the speed of the manually controlled exposure means and the exposure multiplier of the automatic exposure control means and simultaneously adjusting the electrical component with the adjustment of the first means, means for adjusting the indicator means, and means for selectively coupling and uncoupling the indicator adjusting means to said first means to alternatively adjust said indicator means simultaneously with said indicator means and to adjust said first means independently of said first means.

In the preferred form of the improved mechanism the indicator means includes a spring biased take-up reel upon which is wound an indicia carrying tape observable through the view finder and the electrical component includes a variable resistor. The control means includes a knob which controls the value of the variable resistor and is selectively separably coupled to the indicator adjusting means so that when the knob is adjusted to correspondingly adjust the automatic control network to match the speed rating of the film, it is uncoupled from the indicator means so as to effect the film speed rating adjustment independently of the indicator means adjustment. Accordingly, in the automatic operation of the camera, selected under and overexposure may be effected by turning the knob in its coupled automatic set position and the direction and degree of such over and underexposure is observable through the view finder.

The improved camera affords an automatic exposure control operation of great versatility and adaptability in which overexposure or underexposure to an easily observable adjustable degree is conveniently and easily obtainable.

DESCRIPTION OF THE PREFERRED EMBODIMENT

Figure 1:
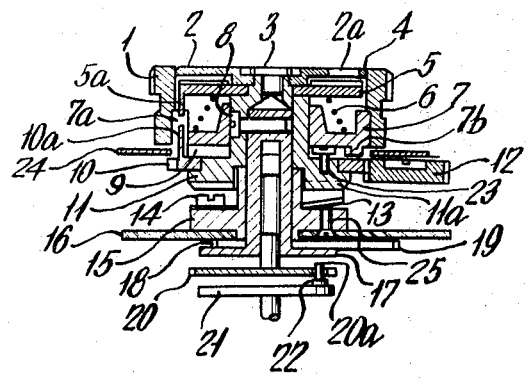
FIG. 1 is a vertical medial sectional view of the control assembly of a preferred embodiment of the present invention.
Figure 2:
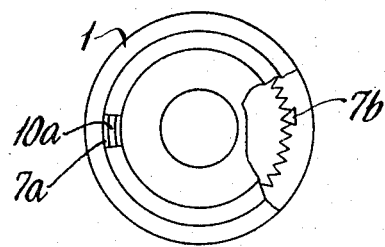
FIG. 2 is a top fragmentary plan view thereof.

Referring now to the drawing which illustrates a preferred embodiment of the present invention, the reference numeral 16 generally designates an upper plate of the camera body to which there is secured with screws 25 a tubular vertical bearing 15. A setting member 11 is fixed by a screw 8 to a cam shaft including a cam 17 which is rotatably journalled in the bearing 15. To a disc 5 having a depending projection 5a is affixed a superimposed ASA scale plate 4. An automatic-manual setting (AUTO-MANU) scale plate 2 is fixed to the setting member 11 by a screw 3 and is coaxially rotatable with the setting member 11. An ASA setting member 9 with a gear defining peripheral portion is fixed to the setting member 11 by a screw 23. A knob 1 is affixed to a coupling ring 7 and is rotatable about the axis of the setting member 11 functioning as a shaft. A projection 7b releasably engages the peripheral gear portion of the ASA setting member 9.

In the axial bore in the cam shaft 17 there is affixed the shaft of a high shutter speed adjusting cam 20 for mechanical shutter speed control so as to be smoothly rotatable, and a pin 22 fixed to a leading screen main gear 21 engages an aperture 20a in the cam 20. The structure of the mechanical shutter is well known and accordingly description thereof is omitted.

When the knob 1 is rotated, due to the engagement of the projection 7b with the peripheral gear portion of the ASA setting member 9, the setting member 11 rotates so that a gear 18 fixed to the cam shaft 17 rotates. Accordingly, through a gear 19, meshing with gear 18, a reel 26, rotatable with gear 19, a string 27 wound on reel 26 and guided by pulleys 28 and 29, a scale tape 31 attached to string 27 is shifted, the tape 31 being urged in the take-up direction by a spring biased take-up drum 30 to which one end is attached. The section of the tape 31 lies in the focal plane of the view finder and is observable through the view finder.

A projection 10a fixed to a gear 10 which is rotatably supported by the setting member 11 functioning as a shaft and the projection 5a engage an aperture 7a in the connection ring 7. Accordingly, the gear 10 rotates with knob 1 so that, through meshing gears 12 and 32, a brush ring 33 is rotated. As a result, the contact position of a brush 34 carried by ring 33 and an associated arcuate resistor 35 varies. The ASA scale plate 4 rotates with the knob 1 to provide an indication of the value as viewed in an ASA indication window 2a of the AUTO-MANU scale plate 2.

A resistor ring 36, to which the resistor 35 is attached, is provided with a projection 36a which is in driving connection with the diaphragm device of the objective lens barrel. An arrangement of values is provided so that a resistance value corresponding to the contact position of the resistor 35 and the brush 34 is obtained which is related exposure factors or parameters other than light information, that is, in case of the present example, of the film ASA rating exposure multiplication and the diaphragm aperture. The setting member 11 is provided with a groove 11a. A click spring 13, which is secured to the bearing 15 by a screw 14, registers with the groove 11a. The desired value or shutter condition can be established by bringing the corresponding value upon the AUTO-MANU scale plate 2 into registration with an index 24a of the upper plate 24. Thus, the rotation of the knob 1 in its normal depressed position causes the rotation of all the associated members, with the bearing 15 serving as the base member, as an integral member.

Figure 3:
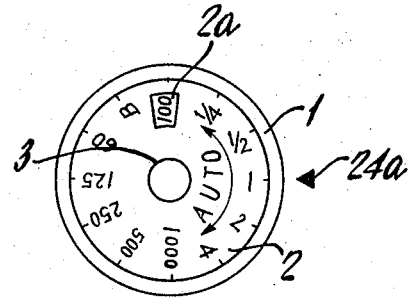
FIG. 3 is a top plan view thereof.
Figure 4:
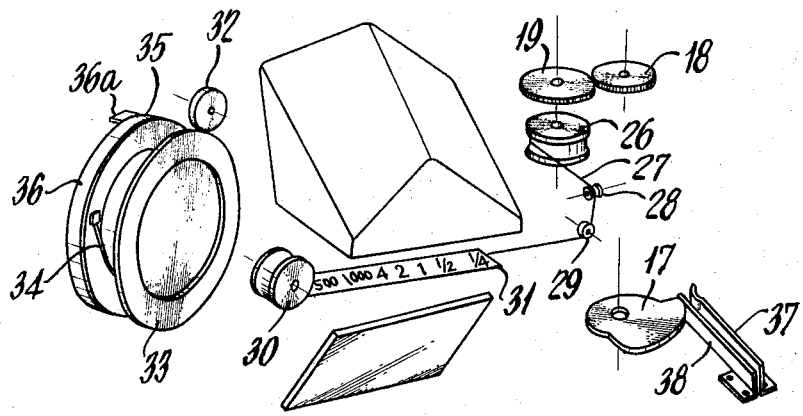
FIG. 4 is a perspective view of the indicating mechanism thereof.

In the example as shown in FIG. 3, if the mechanical shutter scale, that is, the scale 1000 – 60B is brought into registration with the index 24a, in order to deactuate the electronic shutter, the cam of the cam shaft 17 functions to open the contacts 37 and 30 of the current source switch of the automatic exposure network. If the exposure multiplication scale X ¼ – X 4 is to be brought into registration with the index, the electronic shutter is activated by the closure of switch contacts 37 and 38 by the cam 17.

If the knob 1 is lifted against the action of the knob depressing spring 6, the projection 7b is disengaged from the peripheral gear portion of the ASA setting member, so that rotation of the dial 1 thereafter does not cause rotation of the setting member 11. Accordingly, the AUTO-MANU scale plate 2 and the scale tape 31 are also not rotated or shifted. However, the projections 10a and 5a engage the groove 7a, so that the ASA value as seen in the ASA indication window 2a varies, and, owing to rotation of the gear 10, the position of the brush 34 relative to the resistor 35 varies. When the dial 1 is released with the desired ASA scale value, through the action of the spring 6 the projection 7b engages the peripheral gear portion of the ASA setting member.

As explained above, with the present mechanism, the exposure factors including the ASA value and the exposure multiplication can be related through a single variable resistor, the exposure parameter computation is readily effected, the shutter indication of AUTO and MANU in the viewfinder is simply accomplished, the switch connection necessary for AUTO, MANU is simple, so that a very compact camera structure results.

Although the foregoing description has been made with reference to a mechanically controlled shutter as the manually settable shutter, it should be understood that the same is true with respect to a manual set electric shutter.

While there has been described and illustrated a preferred embodiment of the present invention, it is apparent that numerous alterations, omissions and additions may be made without departing from the spirit thereof.

I claim:

1. In a camera including an automatic exposure control network provided with an exposure control variable resistor and a view finder, a moveable indicator observable through said view finder, a manually operable control member, first means mechanically coupling said control member to said resistor to vary the value of said resistor in response to at least one non-light exposure parameter, and second means releasably mechanically coupling said indicator to said control member and selectively uncoupling said indicator from said control member for moving said indicator with said control member when said second means is in its coupled condition.

2. The camera of claim 1 wherein said second means comprises a rotatable shaft and said control member comprises a knob coaxial with said shaft and axially moveable into and out driving engagement with said shaft.

3. The camera of claim 2 including a first disc rotatable with said shaft and having a window formed therein and a film speed indicia carrying second disc underlying said first disc and rotatable with said knob.

4. The camera of claim 3 wherein said second means includes a spring normally urging said second means to its coupled condition.

5. The camera of claim 3 wherein said indicator comprises an indicia carrying tape moveable along the focal plane of said view finder and including a spring biased take-up reel engaging one end of said tape and a string engaging the opposite end of said tape and wound upon a drum and means rotatably coupling said drum to said control member through said second coupling means.

6. The camera of claim 1 wherein said camera includes a manual exposure control mechanism and including a switch means transferrable between closed and open positions respectively activating and deenergizing said automatic control network, said control member being moveable between a first range of positions closing said switch and a second range of positions opening said switch and adjusting said manual control mechanism.

7. In an automatic-manual setting change-over means in an automatic exposure camera including a view finder and in which in coaxial relation with an automatic-manual setting change-over dial computation factors of the sensitivity value of the used film and the exposure multiplication are adjusted by relative rotation, an indication thereof being provided on said automatic-manual setting change-over dial, there is provided a tape visible through said view finder and carrying indicating information of the automatic or manual condition and exposure multiplication, said tape being connected through a transmission including pulleys and a string, with a gear which is coaxial with said automatic-manual setting change-over dial information based on the condition of said automatic-manual setting change-over dial being indicated in the view finder independent of the establishment of the sensitivity value of the used film, and there is provided an automatic-manual change-over switch which responds to said automatic-manual setting change-over dial.

* * * * *

UNITED STATES PATENT OFFICE
CERTIFICATE OF CORRECTION

Patent No. 3,839,723     Dated October 1, 1974

Inventor(s) Naoyuki Uno

It is certified that error appears in the above-identified patent and that said Letters Patent are hereby corrected as shown below:

[73] Assignee: ASAHI KOGAKU KOGYO KABUSHIKI KAISHA
Tokyo-to, Japan

Signed and sealed this 14th day of January 1975.

(SEAL)
Attest:

McCOY M. GIBSON JR.
Attesting Officer

C. MARSHALL DANN
Commissioner of Patents